United States Patent
Peterson et al.

(10) Patent No.: US 6,276,517 B1
(45) Date of Patent: Aug. 21, 2001

(54) ICE CONVEYOR

(75) Inventors: Timothy G. Peterson, Marshall; Richard J. Donahue, Belleville; Craig H. Melter, Middleton, all of WI (US)

(73) Assignee: Protoco, Inc, Middleton, WI (US)

(\*) Notice: Subject to any disclaimer, the term of this patent is extended or adjusted under 35 U.S.C. 154(b) by 0 days.

(21) Appl. No.: 09/477,144

(22) Filed: Jan. 3, 2000

(51) Int. Cl.$^7$ .................................................. B65G 19/14
(52) U.S. Cl. ...................................... 198/716; 198/733
(58) Field of Search .................................... 198/716, 728, 198/730, 731, 733

(56) References Cited

U.S. PATENT DOCUMENTS

| | | |
|---|---|---|
| 2,249,588 | 7/1941 | Waddle . |
| 2,652,808 | 9/1953 | Wagner . |
| 3,962,996 | 6/1976 | Jones et al. . |
| 3,971,714 | 7/1976 | Jones et al. . |
| 3,993,184 * | 11/1976 | Campbell ........................ 198/716 X |
| 4,031,857 | 6/1977 | Jones . |
| 4,071,136 | 1/1978 | Jones . |
| 4,130,223 | 12/1978 | Jones . |
| 4,180,136 | 12/1979 | Jones . |
| 4,195,725 | 4/1980 | Jones . |
| 4,243,193 | 1/1981 | Jones . |
| 4,391,361 | 7/1983 | Hall et al. . |
| 4,395,973 | 8/1983 | Hall et al. . |
| 4,871,060 | 10/1989 | Dahl et al. . |
| 5,104,007 | 4/1992 | Utter . |
| 5,112,477 | 5/1992 | Hamlin . |
| 5,165,255 | 11/1992 | Alvarez et al. . |
| 5,186,312 * | 2/1993 | Ambs et al. ........................ 198/716 |
| 5,205,416 | 4/1993 | Van Zee . |
| 5,267,672 | 12/1993 | Jacobsen et al. . |

\* cited by examiner

Primary Examiner—James R. Bidwell
(74) Attorney, Agent, or Firm—Lathrop & Clark LLP

(57) ABSTRACT

A series of regularly spaced cylindrical paddles are affixed to a steel strand cable. Each end of the cable is provided with a swaged ball shank which is pivotably received within a nut. The threaded nuts are connected by a threaded screw. The paddles are advanced on the cable through a conduit by a rotatable drive wheel. The system is thus adapted for moving ice cubes and chips. The drive wheel has eight teeth, each of which has a connector trough dimensioned to receive the connector assembly. Each tooth has a leading finger with a drive face which engages a paddle when it is received within a paddle trough defined between neighboring teeth. The drive face has a radially extending wall which engages the disk of the paddle, and a second radially extending wall spaced outwardly from the first which engages the protruding shoulder of the disk, such that the disks are always driven at two spaced locations. Each of the tooth fingers has a peripheral groove which is curved to receive the cable as it extends between paddles. Because the teeth do not drive against the connector, and because the paddles are engaged repeatedly at multiple locations, the wear on the system is minimized.

7 Claims, 3 Drawing Sheets

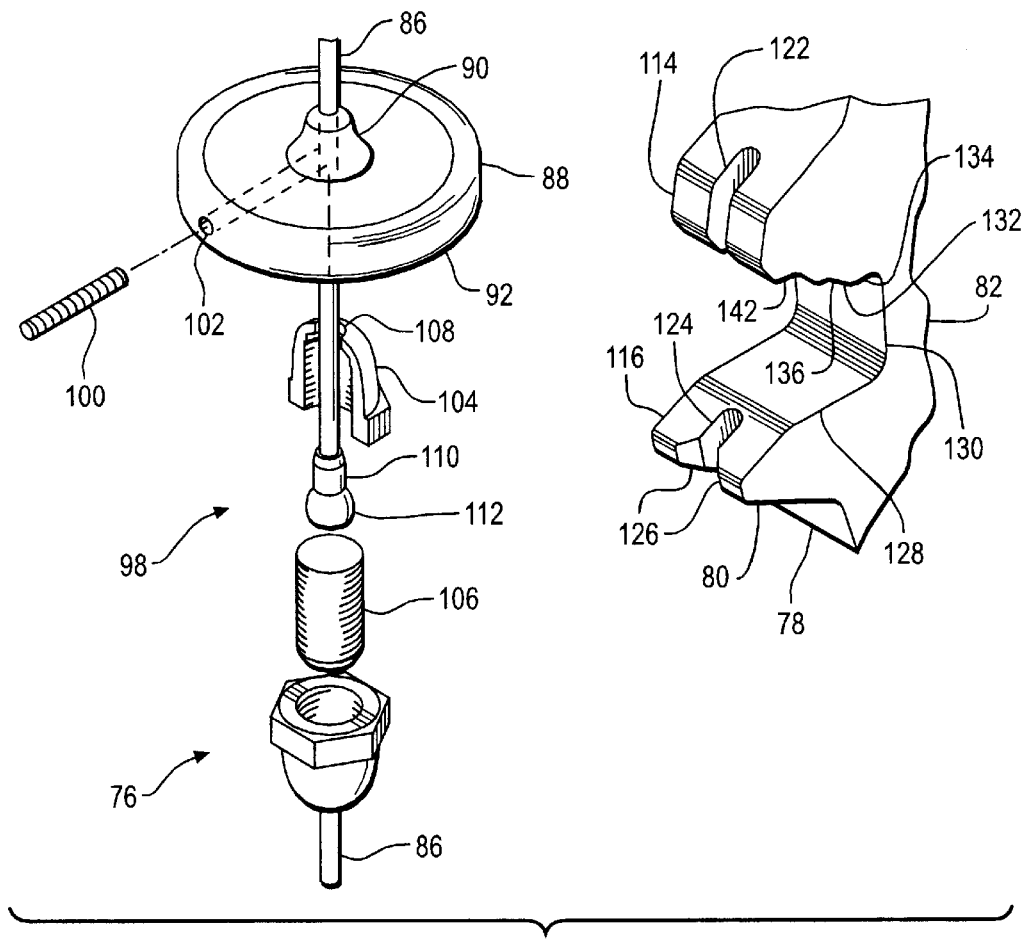
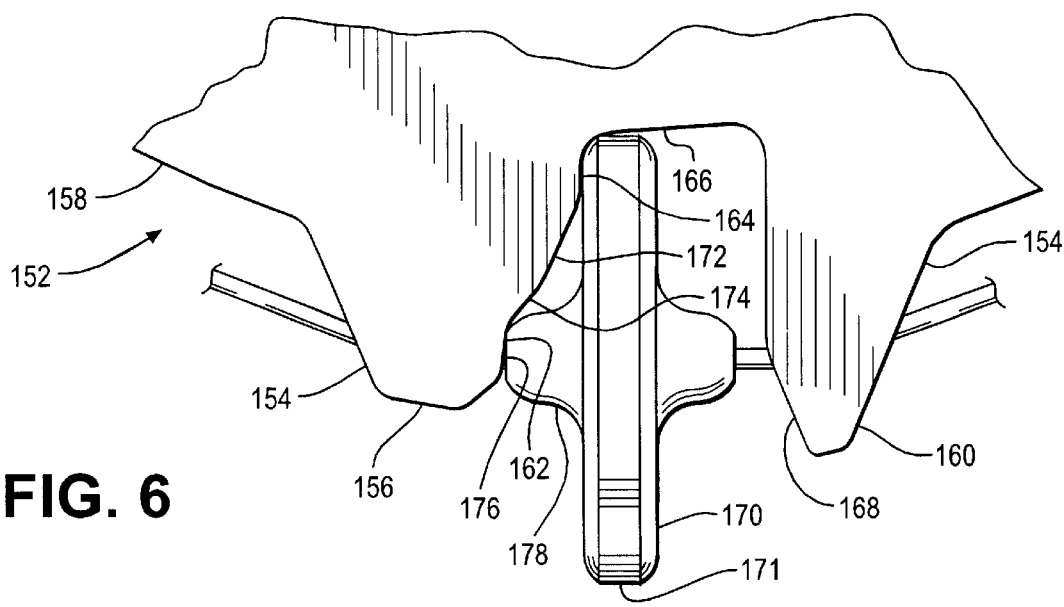
FIG. 5
FIG. 6

ICE CONVEYOR

CROSS REFERENCES TO RELATED APPLICATIONS

STATEMENT AS TO RIGHTS TO INVENTIONS MADE UNDER FEDERALLY SPONSORED RESEARCH AND DEVELOPMENT

BACKGROUND OF THE INVENTION

The present invention relates to conveyors in general, and to devices for advancing fragments of water ice in particular.

Wherever meals are served, diners will naturally choose a beverage to accompany their entree. Where the beverage is a carbonated drink, a fruit juice, an ice tea, or other water-based drink, the coolness of the drink increases the satisfaction of the consumer. No matter how cool the drink is at time of dispensing—and most drinks cannot be chilled below 32 degrees Fahrenheit—a few minutes in a room temperature receptacle will cause the liquid to warm noticeably. The answer to maintaining drinks at near-freezing temperatures has been known for centuries—chips or cubes of water ice suspended in the drink will depress the liquid temperature until all the ice is melted.

Twentieth century developments in refrigeration have made high-quality, high purity ice chips and ice cubes available year-round in all climates. A highly competitive business environment and an ever-increasing demand for quality service at a reasonable cost has seen the restaurant and food service industry work to deliver cool drinks to customers rapidly and with a minimum of labor.

One approach to satisfying this need is to make fountain beverages, fruit juices, and other drinks available to customers at self-service dispensing stations. These stations also provide a customer-operated source of ice chips or cubes. The self-service beverage stations relieve congestion at the cash register, speed up the delivery of beverages to the customer, and allow each consumer to select the ratio of ice to beverage desired. To assist with traffic flows, it would be desirable to place beverage stations in locations remote from the teller or order taker. On the other hand, from a service standpoint, if frequent trips to the beverage station for ice replenishment are required by the restaurant personnel, the beverage station should be located close at hand.

By positioning the ice reservoir or ice maker at a location remote from the beverage dispensing stations, both the needs of customer convenience and ease of stocking can be satisfied. The ice dispenser and display disclosed in U.S. Pat. No. 5,267,672, the disclosure of which is incorporated by reference herein, provided a conveyor system using a single looped wire or cable having evenly spaced paddles which advanced ice chips through a cylindrical conduit This system allowed a stockpile of ice to be positioned below the counterfor advancement to and dispensing from above-counter outlets. The conveying chain was driven by a single cog wheel which engaged several paddles at a time and thereby advanced the entire looped chain of paddles as well as the ice engaged by the paddles. However, this system, through many hours of reliable dispensing of ice, induced wear on the cog, the paddles, and the connecting hardware.

In addition to requiring ice in beverages procured at a dining facility, consumers may purchase bags of ready-made ice cubes or chips, especially when quantities of ice are required that are not conveniently prepared in a home freezer. Hence many retail outlets will sell bagged ice, either prepared on the premises, or purchased from suppliers. In order to conveniently dispense ice downwardly into containers, the ice must first be elevated above the level of the bags. If the ice is to be elevated by a conveyor, compactness and long-term operation of the conveying system is highly desirable.

What is needed is an effective ice conveyor system having extended wear life.

SUMMARY OF THE INVENTION

The ice conveyor of this invention has a series of regularly spaced cylindrical paddles which are affixed to a steel strand cable. Each end of the cable is provided with a swaged ball shank which is pivotably received within a nut. The threaded nuts are connected by a threaded screw. The paddles are advanced on the cable through conduit by a rotatable drive wheel. The drive wheel has eight teeth, each of which has a connector trough dimensioned to receive the connector assembly. Each tooth has a leading finger with a drive face which engages a paddle when it is received within a paddle trough defined between neighboring teeth. The drive face has a radially extending wall which engages the disk of the paddle, and a second radially extending wall spaced outwardly from the first which engages the protruding shoulder of the disk, such that the disks are always driven at two spaced locations. Each of the tooth fingers has a peripheral groove which is curved to receive the cable as it extends between paddles. Because the teeth do not drive against the connector, and because the paddles are engaged repeatedly at multiple locations, the wear on the system is minimized.

It is an object of the present invention to provide a conveyor for ice chips and cubes which advances ice to a dispensing outlet from an ice reservoir.

It is another object of the present invention to provide an ice conveyor of extended wear life.

It is a further object of the present invention to provide a drive wheel for an ice conveyor which makes contact with the individual paddles of the conveyor cable with low impact.

Further objects, features and advantages of the invention will be apparent from the following detailed description when taken in conjunction with the accompanying drawings.

BRIEF DESCRIPTION OF THE DRAWINGS

FIG. 5 is an exploded fragmentary isometric view of the cable assembly of FIG. 1 in relationship to the drive wheel.

FIG. 6 is a fragmentary side elevational view of an alternative embodiment drive wheel of this invention.

DESCRIPTION OF THE PREFERRED EMBODIMENTS

Figure 1:
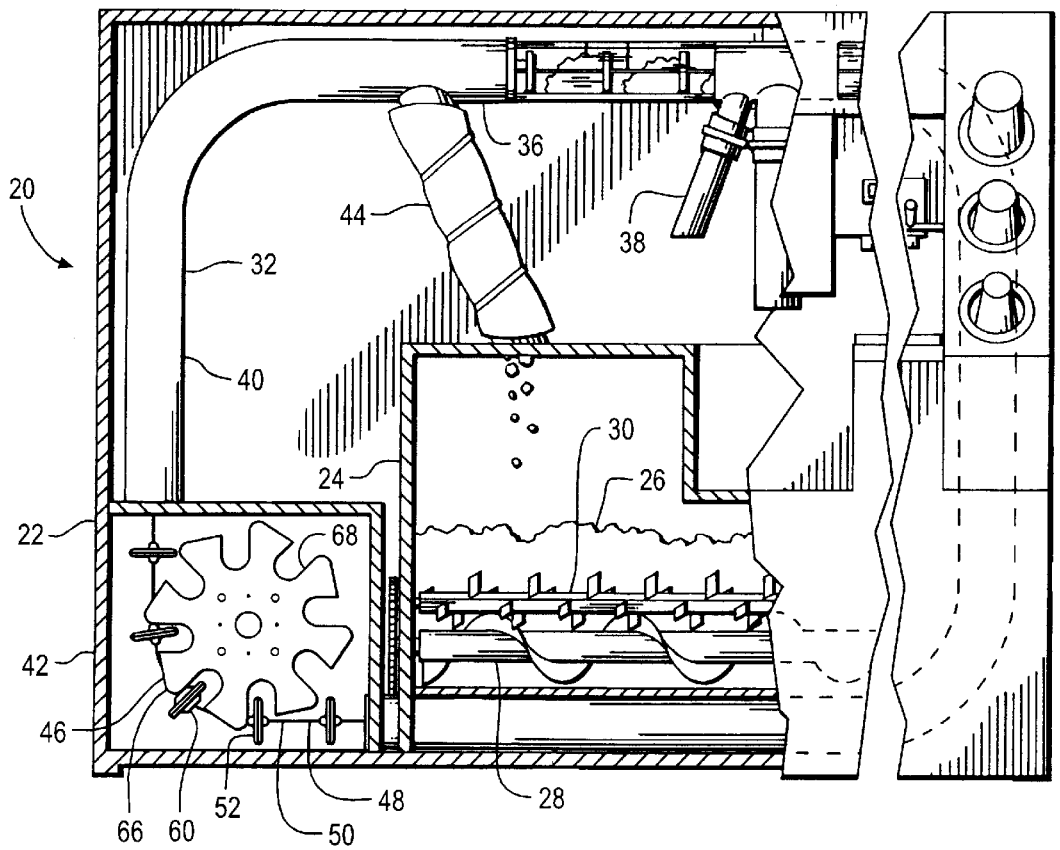
FIG. 1 is a fragmentary cross-sectional view of a prior art ice conveying apparatus.
Figure 2:
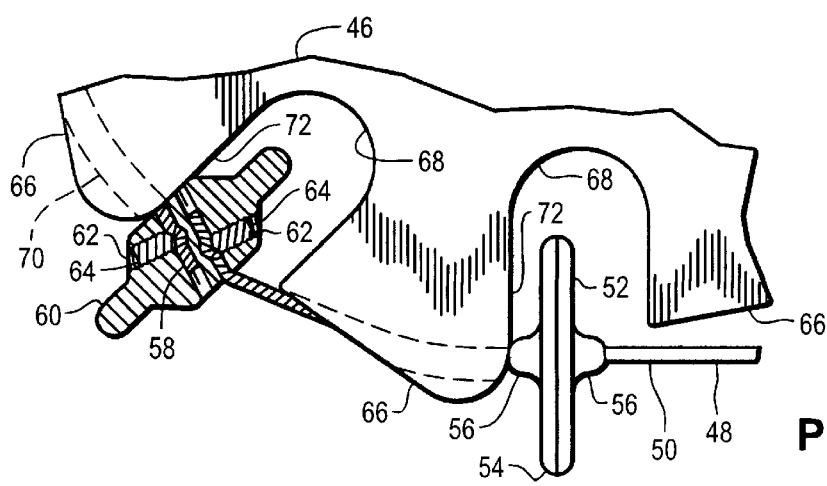
FIG. 2 is an enlarged fragmentary cross-sectional view of a drive wheel and cable connector and paddle cable assembly of the apparatus of FIG. 1.

Referring more particularly to FIGS. 1–6, wherein like numbers refer to similar parts, a prior art ice dispensing apparatus 20 is shown in FIGS. 1–2. The apparatus 20 is of the type disclosed in U.S. Pat. No. 5,267,672. The apparatus has a housing 22 which contains an ice chest 24 which is supplied with cube or chip ice 26. The ice chest 24 is provided with an auger 28 and agitator shaft 30 which advance ice from within the chest to the inlet, not shown, of an ice conduit 32 which extends beneath the chest 24. The ice conduit 32 describes a loop that extends upwardly from the chest 24 to an overhead run 36 which discharges to one or more gate valve controlled outlets 38. The overhead run 36 of the conduit 32 loops downwardly to a down run 40 which discharges into a drive wheel box 42. A return shaft 44 extends between the overhead run 36 of the conduit 32 and the ice chest 26, at a position ahead of the down run 40.

A rotatable drive wheel 46 is mounted within the drive wheel box 42 and is driven by an electric motor, not shown. The drive wheel 46 is a solid plastic part, fabricated, for example, of HDPE. The drive wheel 46 drives a flexible cable paddle assembly 48 which is disposed in a continuous loop within the conduit 32. The cable paddle assembly 48 of the prior art apparatus 20 is comprised of a flexible wire strand cable 50 to which plastic paddles 52 have been fixed at regular intervals. The paddles 52 are generally disk shaped having a central generally cylindrical disk 54, with leading and trailing protruding shoulders 56. The disk 54 of the prior art paddle 52 has a radiused outer periphery, as shown in FIG. 2. The two ends 58 of the cable 50 are joined together within a single master paddle 60. As shown in FIG. 2, the master paddle 60 has two holes 62 extending through the disk, each hole receiving one end of the cable 50. The cable ends 58 are fixed within the master paddle 60 by screws 64. This prior art connection can cause the cables to flex near their attachment to the master paddle, causing cold working and possible fatigue fracture of cables. The drive wheel 46 has regularly spaced protruding teeth 66 divided by semicircular U-shaped valleys 68. Each tooth 66 has a curved groove 70 recessed therein, through which the cable 50 extends as the assembly 48 is turned about the drive wheel 46.

As the drive wheel 46 is rotated, the teeth 66 sequentially engage the paddles 60 at leading tooth bearing faces 72, thereby advancing the entire cable paddle assembly 48 through the conduit 32. Ice which falls into the conduit from the ice chest is then engaged by the paddles and driven along the path of the conduit 32 to be either dispensed at an outlet, or returned through the return shaft 44. Because of the position of the return shaft 44, no ice is allowed to enter the drive wheel box 42.

In optimal operation, the bearing faces 72 engage only the shoulders 56 of the paddles 52. Nevertheless, from time to time the paddles may become tilted or canted within the valleys 68, with the result that the bearing faces engage the disks 54 of the paddles instead of the shoulders. This variation in engagement point can, over time, place undesirable stresses upon the conveying system, tending toward early wear. Moreover, as shown in FIG. 2, the drive wheel drives directly on the master paddle 60 as it cycles through the drive wheel once each revolution of the cable paddle assembly 48.

Figure 3:
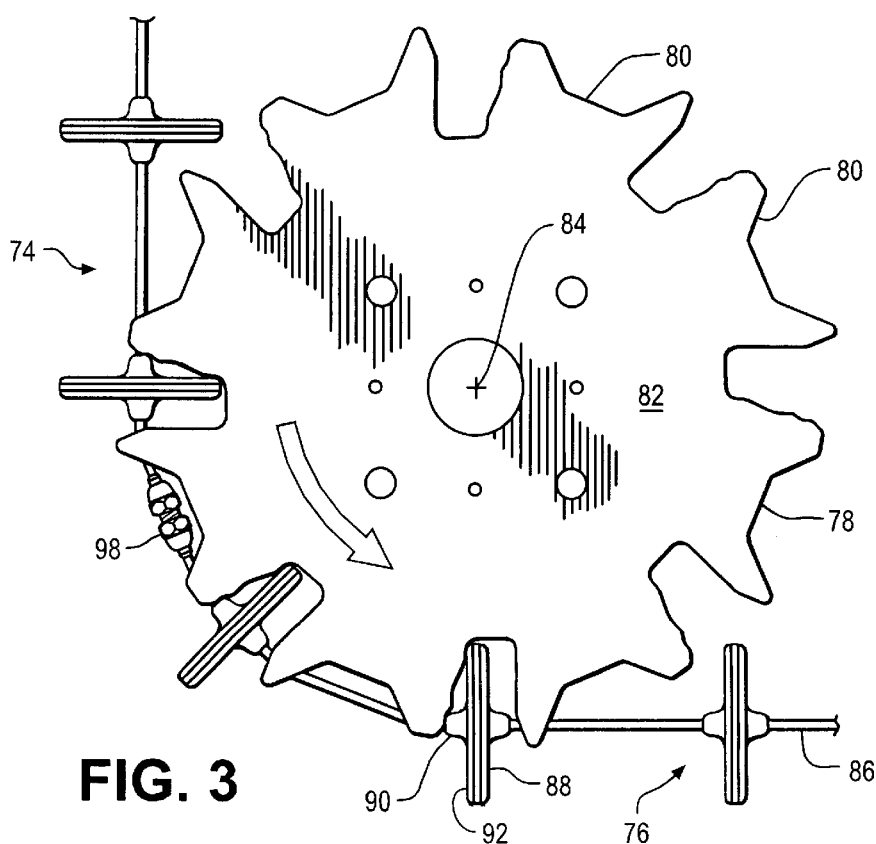
FIG. 3 is a front elevational view of the ice conveying apparatus drive wheel and cable connector and paddle cable assembly of this invention.

The ice conveying apparatus 74 of this invention also has an ice chest, a conduit, a return shaft, and ice outlets as in the apparatus of FIG. 1, although in a preferred embodiment, the ice chest does not have an auger 28, but relies on the agitator shaft 30 alone. However, the apparatus of this invention differs from the device of FIG. 1 in the provision of the cable paddle assembly 76 and the drive wheel 78. The drive wheel is a single integral piece formed from HDPE plastic. As shown in FIG. 3, the drive wheel 78 has eight complex teeth 80 which protrude radially outwardly from a drive wheel body 82 which is fixed to the drive motor, not shown, to rotate about an axis 84.

Stresses on the cable 86 and individual paddles 88 of the cable paddle assembly 76 are reduced by configuring the teeth 80 to consistently engage both the shoulder 90 and the disk 92 of each paddle. Furthermore, the first end 94 of the cable 86 is connected to the second end 96 of the cable by a cable connector assembly 98 which does not reside within any paddle. Hence, the master paddle is eliminated. All the individual paddles 88 may be identical, and are fixed at regular intervals to the cable 86 by a single set screw 100 per paddle which extends through a threaded opening 102 in the plane of the paddle disk 92. To better control the position of the paddles 88 as they travel over the teeth of the drive wheel 78, the outer periphery of each paddle disk 92 is defined by a cylindrical surface 99, shown in FIG. 4, which extends axially about 0.146 inches of the total disk thickness of about 0.438 inches. The cable 86 may be a conventional stainless-steel strand cable, having a nylon outer covering. For example a ⅛ inch diameter stainless steel cable with 7 bundles of 19 strands, with a nylon sheath having an outer diameter of about 3/16 inches. The cable connector assembly 98 engages the two ends 94, 96 of the cable 86 to form the cable paddle assembly 76 into a single continuous loop. Moreover, the cable connector assembly retains the flexibility of the cable and minimizes repeated bending forces applied to the cable at the connector.

Figure 4:
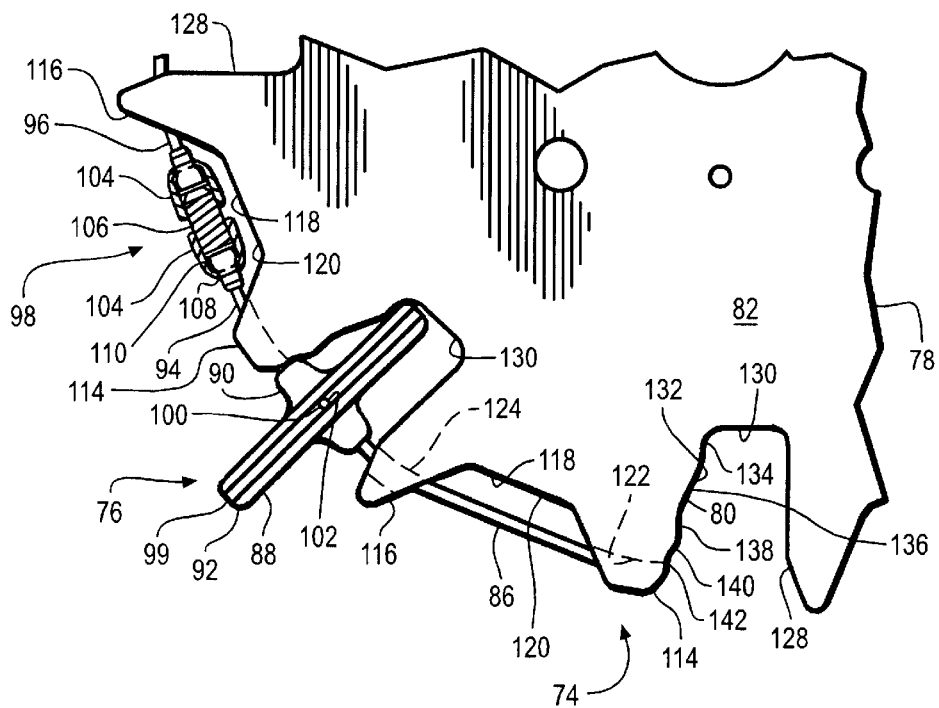
FIG. 4 is an enlarged fragmentary side elevational view of the apparatus of FIG. 3.

As best shown in FIGS. 3–5, the cable connector assembly has two threaded nuts 104, which are connected to one another by a threaded screw 106. The threaded nuts 104 have a cable opening 108 at one end, with the other end opening toward the other nut. The nuts 104 may be machined from conventional acorn nuts, for example 7/16 hex nut acorn nuts. The cable opening 108 is machined in the end of the acorn nut, with for example, a countersunk 0.266 diameter hole. The acorn nuts may be of 18-8 stainless steel. The connecting screw 106 may be a conventional socket set screw, 0.750 inches long, 7/16 inches in diameter with 20 threads.

As shown in FIG. 5, each end of the cable 86 is terminated with a single ball shank swage fitting 110, which is swaged to the cable end. The fitting 110 has a semi-spherical ball end 112 which permits the fitted cable end to be received within the nut 104, and allows the end to pivot and rotate in that connection without substantially bending the cable 86 itself. This "ball and socket" type connection reduces the tendency of the cable to fatigue at the end connection. The set screw 106 does not touch the ball ends 112, and does not interfere with the rotation of the connection. The swage fittings 110 are positioned on the cable ends 58 such that the cable connector assembly 98 is centered between two regularly spaced paddles 88. For accurate placement of the paddles and the cable connector assembly, the cable paddle assembly 76 is preferably assembled on a fixture. Any slack in the system may be adjusted by moving the drive wheel and attached drive motor within slots on a housing plate.

As shown in FIGS. 3–4, the drive wheel 78 is configured to advance the cable paddle assembly 76 by engaging individual paddles 88 while at the same time providing clearance for the connector assembly 98 to avoid direct engagement between the connector assembly and the drive wheel teeth 80. Each tooth 80 has a leading finger 114 and a trailing finger 116, with a connector trough 118 defined between the leading finger and the trailing finger. In the illustrated apparatus, the paddles 88 have a diameter of about four inches and a disk thickness of about 0.44 inches, with shoulders 90 which protrude about 0.44 inches from the disk on either side. The paddles 88 are spaced along the cable 86 about 5.5 inches from center to center. The distance from the drive wheel 78 axis 84 to the cable 86 when it is engaged on the drive wheel 78 is about seven inches. The connector trough 118 has a floor 120 which is about 1.4 inches extending circumferentially, and is spaced about 6.5 inches from the axis 84. As shown in FIG. 5, the leading finger 114 has a curved U-shaped groove 122, with a floor at a distance of about seven inches from the axis 84. The trailing finger 116 has a U-shaped groove 124 spaced the same distance from the axis 84. However, the trailing finger protrudes to a distance of about 7.63 inches from the axis 84, while the leading finger protrudes to a distance of about 7.38 inches from the axis. The trailing finger 116 has beveled inlet walls 126 which assist in directing the cable 86 into the groove 124.

A paddle trough 128 is defined between the trailing finger 116 of each tooth 80 and the leading finger 114 of a neighboring tooth. The paddle trough 128 has a floor 130 which is spaced approximately 5.3 inches from the axis 84. The leading finger 114 has a bearing face 132 which faces the paddle trough 128 and which has surfaces which engage a paddle 88 to advance the paddle cable assembly through the conduit. A disk engagement wall 134 extends approximately radially from the paddle trough floor 130, and is positioned to engage against the disk 92 of a paddle. A first inclined wall 136 extends radially outwardly and away from the disk engagement wall 134. A radial wall 138 extends radially outwardly from the first inclined wall 136, and a second inclined wall 140 extends radially outwardly and away from the radial wall 138. A shoulder engagement wall 142 extends radially outwardly from the second inclined wall 140. The U-shaped groove 122 extends through the shoulder engagement wall 142. The shoulder engagement wall 142 is positioned to engage the shoulder 90 of a paddle 88. The inclined walls 136, 140 help to position the paddle 88 within the paddle trough 128 with the disk optimally positioned adjacent the trough floor 130.

In operation, as shown in FIG. 3, the cable paddle assembly 76 turns around about 90 degrees of the drive wheel 78. At any time, as many as three paddles 88 are in position to be engaged by the leading fingers 114 of the teeth 80. As the downwardly extending cable paddle assembly 76 approaches the drive wheel, the leading finger of a tooth 80 first engages the paddle 88. As the drive wheel 78 rotates, the surfaces of the leading finger 114 bearing face 132 engage the beveled edges of the paddle disk 92 and assist the entry of the paddle into the paddle trough 128, moving from a position in which the cable 86 is tangent to the drive wheel, to a position in which the paddle disk 92 extends along a radial plane which intersects the axis 84. The greater extension of the trailing finger 116 permits the drive wheel 78 to make contact with the cable 86 sooner, and thereby help to restrict flexing or other misalignment of the cable with respect to the drive wheel. When fully engaged by the wheel 78, the trailing finger 116 is positioned just ahead of the next paddle 88. The engagement of the cable in the grooves of the leading and trailing fingers preferably minimizes the amount and angle of flexing of the cable where it is connected to the paddles, to reduce fatigue to the cable.

It will be noted that once in a revolution of the cable paddle assembly 76, the connector assembly 98 will pass around the drive wheel 78. When this occurs, the cable connector assembly 98 is received within the cable connector trough 118. Hence, the drive wheel does not drive directly on the cable connector assembly 98.

An alternative embodiment drive wheel 150 for use with a smaller diameter paddle 152 is shown in FIG. 6. The paddle 152 may be about 3 inches in diameter. The drive wheel 150 has eight teeth 154 with a leading finger 156 spaced across a connector trough 158 from a trailing finger 160. The leading finger has an engagement face 162 with a first radially extending wall 164 which extends from the floor 166 of a paddle trough 168, and which is positioned to engage the disk 170 of the paddle 152. The disk 170 has a cylindrical peripheral wall 171. A first inclined wall 172 extends radially and outwardly from the wall 164, and a second inclined wall 174 extends radially and outwardly from the first inclined wall, and intersects a shoulder engagement wall 176 which extends substantially radially and which serves to drive against the shoulder 178 of the paddle 152.

It is understood that the invention is not limited to the particular construction and arrangement of parts herein illustrated and described, but embraces such modified forms thereof as come within the scope of the following claims.

We claim:

1. An ice conveying apparatus comprising:

a cable having two ends which are formed into a loop by a connector assembly;

a plurality of paddles fixed to the cable at regular intervals, wherein a first distance is defined between each pair of neighboring paddles measured along the cable, wherein the connector assembly is spaced between two neighboring paddles;

a conduit through which the cable and paddles extend;

a drive motor;

an integral plastic drive wheel connected to and driven by the drive motor, wherein the drive wheel has a plurality of radially projecting teeth spaced around the perimeter of the drive wheel, wherein a paddle trough is defined between two subsequent teeth, portions of each tooth adjacent a paddle trough defining a bearing face, the cable extending around a fraction of the drive wheel, such that the paddles extend within a paddle trough with portions of one of said paddles engage a tooth bearing face as it is engaged by the drive wheel, and wherein portions of each tooth, spaced from the paddle trough, define a connector trough, and wherein the connector assembly extends within one of said connector troughs when passing around the drive wheel.

2. A one-piece plastic drive wheel for an ice conveying apparatus having a flexible cable with a plurality of paddles fixed thereto at regular intervals, the drive wheel comprising:

a body having an axis about which the drive wheel rotates;

a plurality of teeth which protrude radially from the body, wherein a paddle trough is defined by portions of each two adjacent teeth, each paddle trough having a floor which is spaced less than a first distance from the axis;

portions of each tooth which define a leading radially protruding finger;

portions of each tooth which define a trailing radially protruding finger, wherein the paddle trough is defined between the trailing finger of a first tooth and the leading finger of a second tooth;

portions of each tooth leading finger which define a bearing face which opens to a paddle trough for engagement with portions of a paddle disposed within said trough, wherein the leading finger of a tooth protrudes radially from the axis a distance which is less than the distance which the trailing finger of said tooth protrudes radially from the axis; and portions of each tooth which define a connector trough between the leading finger and the trailing finger of said tooth, the connector trough having a floor which is spaced from the axis a distance greater than the first distance, the connector trough receiving a cable connector therein when a paddle is engaged within a preceding paddle trough.

3. The drive wheel of claim 2 wherein the leading fingers and the trailing fingers have portions defining circumferentially extending grooves which face radially outwardly and receive a cable therein.

4. The drive wheel of claim 3, wherein portions of the trailing finger define beveled surfaces which extend outwardly from the trailing finger groove.

5. The drive wheel of claim 2 wherein the bearing face of each tooth has portions defining a shoulder contact wall which is spaced upstream of a disk contact wall, the disk contact wall being positioned adjacent the paddle trough floor.

6. An ice conveying apparatus comprising:

a cable having a first end and a second end a first ball shank fixed to the cable first end:

a first nut having a cable opening and a threaded cup, the cable extending through the first nut cable opening and the first ball shank being retained within the threaded cup;

a second ball shank fixed to the cable second end;

a second nut having a cable opening and a threaded cup which faces the first nut threaded cup, the cable extending through the second nut and the second ball shank being retained within the second nut threaded cup;

a screw engaged with the first nut and the second nut to connect the cable first end to the cable second end in a closed loop;

a plurality of paddles fixed to the flexible cable at regular intervals;

a conduit through which the flexible cable extends;

a drive motor; and a drive wheel connected to and driven by the drive motor, wherein the drive wheel has a plurality of radially projecting teeth spaced around the perimeter of the drive wheel, wherein a paddle trough is defined between two subsequent teeth, portions of each tooth adjacent a paddle trough defining a bearing face, the flexible cable extending around a fraction of the drive wheels, such that a paddle, when engaged on the drive wheel, extends within a paddle trough with portions engaging a tooth bearing face, and wherein portions of the drive wheel are relieved to avoid contact with the first nut connected to the second nut.

7. An ice conveying apparatus comprising:

a cable having a first end and a second end a first fitting fixed to the cable first end:

a second fitting fixed to the cable second end;

a first fastener half having an opening through which the cable first end extends, the first fitting being retained therein in a ball and socket connection, a second fastener half having an opening through which the cable second end extends, the second fitting being retained therein in a ball and socket connection, wherein the first fastener half is connected to the second fastener half to form the cable into a continuous loop;

a plurality of paddles fixed to the flexible cable at regular intervals;

a conduit through which the flexible cable extends;

a drive motor; and a drive wheel connected to and driven by the drive motor, wherein the drive wheel has a plurality of radially projecting teeth spaced around the perimeter of the drive wheel, wherein a paddle trough is defined between two subsequent teeth, portions of each tooth adjacent a paddle trough defining a bearing face, the flexible cable extending around a fraction of the drive wheels, such that when engaged by the drive wheel, the paddles extend within a paddle trough with portions engaging a tooth bearing face.

* * * * *